United States Patent [19]

Kelly, Jr. et al.

[11] 4,190,800
[45] Feb. 26, 1980

[54] ELECTRICAL LOAD MANAGEMENT SYSTEM

[75] Inventors: Jack R. Kelly, Jr., Stone Mountain; Glen P. Robinson, Jr., Atlanta, both of Ga.

[73] Assignee: Scientific-Atlanta, Inc., Atlanta, Ga.

[21] Appl. No.: 968,811

[22] Filed: Dec. 12, 1978

Related U.S. Application Data

[63] Continuation of Ser. No. 743,668, Nov. 22, 1976, abandoned.

[51] Int. Cl.² .......................... H04N 7/24; H04M 11/04
[52] U.S. Cl. ............................................ 325/37; 325/54; 325/308; 340/163; 340/310 A
[58] Field of Search ........................... 340/310 A, 163; 325/308, 309, 37, 53, 54, 64; 364/492; 307/38, 40

[56] References Cited

U.S. PATENT DOCUMENTS

| | | | |
|---|---|---|---|
| 3,683,343 | 8/1972 | Feldman et al. | 340/310 A |
| 3,855,503 | 12/1974 | Ristuccia | 340/310 A |
| 3,942,170 | 3/1976 | Whyte | 340/310 A |
| 3,967,264 | 6/1976 | Whyte et al. | 340/310 A |

*Primary Examiner*—John C. Martin
*Attorney, Agent, or Firm*—Cushman, Darby & Cushman

[57] ABSTRACT

A central station monitors the use of electrical power and when peak demand periods occur, coded information is transmitted by radio from the central station to remote receivers mouned on poles proximate power distribution transformers serving the customers. The transmitted signal includes both address and command information which are decoded at the receivers. Those receivers which have been addressed pass the command information as carrier signals over the distribution lines from the secondaries of the respective distribution transformers to the customers. This address information informs the customers of the existence of the peak load conditions and/or controls the operation of the customers' power consuming devices and electric meter.

7 Claims, 6 Drawing Figures

ELECTRICAL LOAD MANAGEMENT SYSTEM

This is a continuation of application Ser. No. 743,668 filed Nov. 22, 1976, now abandoned.

BACKGROUND OF THE INVENTION

An important problem facing the country is the increased demand for electrical power. For the most part, electrical utilities have relied on volunteer cooperation from individuals and industry to reduce power consumption. However, with the capacities of power generating facilities being more frequently strained to the point of causing occasional "brown-outs," substantial attention has been given to ways of reducing electrical demand.

Electrical rates based on peak demand are common in industry. If the peak demand can be reduced by diverting some energy requirements to non-peak hours, a considerable savings on electrical bills can be realized. There have been a number of proposals to also place households on peak demand rates. This would give the home owner an incentive to control his power consumption provided he is supplied with a device which will indicate to him when a peak demand period is being experienced.

Another possibility for reducing peak demand period consumption is to remotely control the operation of energy consuming devices both in industry and in the home.

With either of the foregoing approaches, it is necessary to provide a communication system between the utility which monitors the total power consumption and the customers. Several attempts have been made in the past to accomplish this. Such efforts are summarized in an article entitled "Creative Electric Load Management" by Thomas Laaspere and Alvin O. Converse, appearing in the February, 1975 issue of IEEE SPECTRUM, pp. 46–50. Basically, these previous approaches have a. used the transmission and distribution lines as the transmission medium; or b. employed only radio communication.

With respect to transmission line systems, the use of low frequency signals on the lines requires a great amount of power to successfully transmit. When higher frequency carriers are employed, substantial transmission line losses are experienced.

With a radio system, a separate receiver is required at each remote location, and this is an extremely expensive undertaking. Furthermore, reception tends to be unreliable since the receivers are often located in low lying areas, near reflectors, etc.

SUMMARY OF THE INVENTION

The present invention overcomes the shortcomings of previously known electrical load management systems. More particularly, the difficulties in utilizing transmission lines as the communication medium are avoided by employing a radio network from the utility to pole-mounted distribution transformers where radio receivers are located. The receivers are selectively addressed by the coded signal which is transmitted. The receivers are connected to distribution lines from the secondary side of the distribution transformers by circuitry which impresses carrier signals on the lines. Thus, command information is directed to those customers associated with the addressed receivers in order to provide the users with load status data and/or to control the operation of the users' power consumption devices and electric meter.

Details of the invention now will be presented in the following description and in the accompanying drawings wherein.

DETAILS OF THE INVENTION

Figure 1:
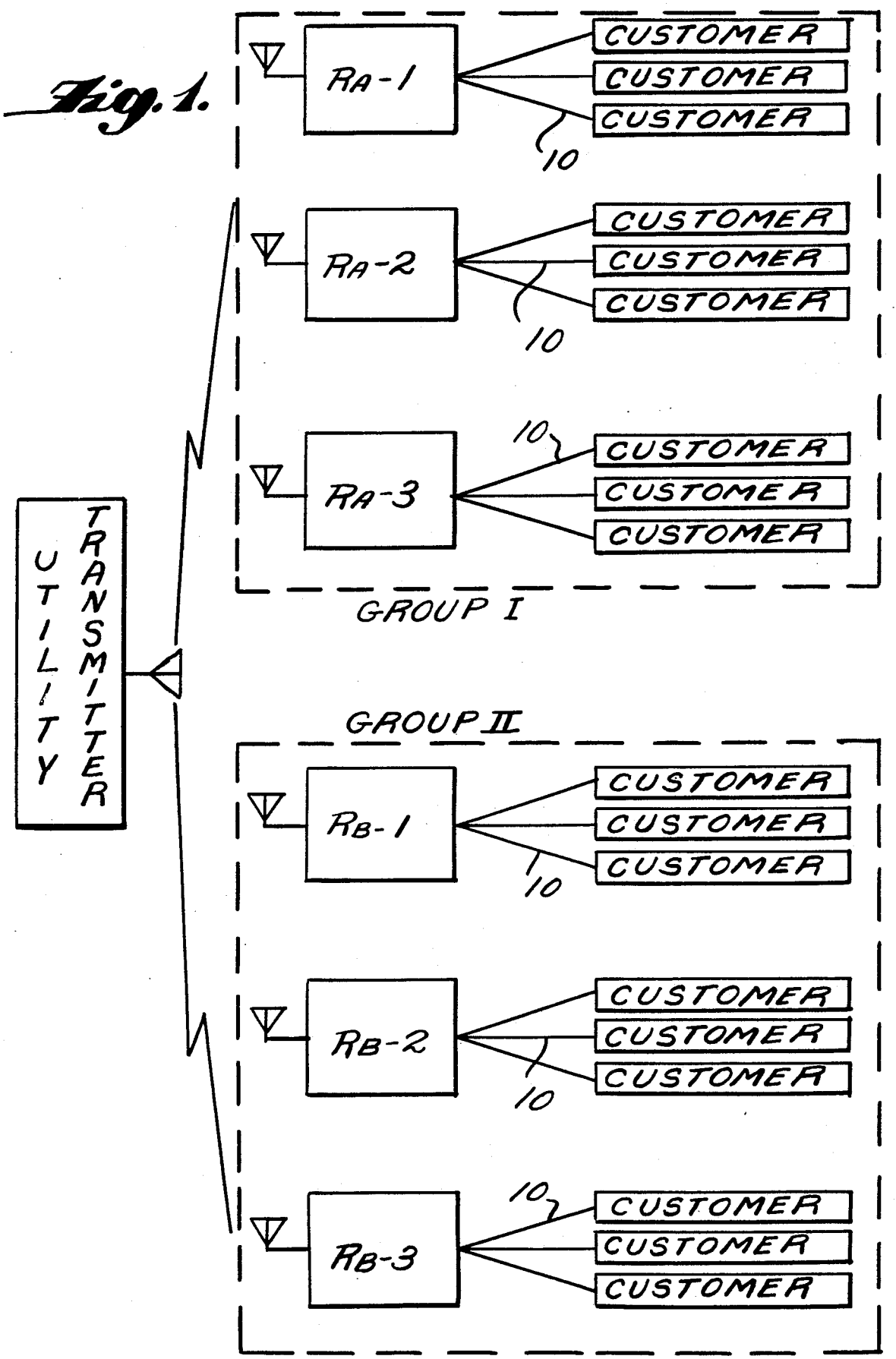
FIG. 1 is a block diagram of the overall electrical load management system.

Referring first to FIG. 1, the overall electrical load management system is illustrated. A radio transmitter centrally located at the power utility sends load information in the form of coded signals to its customers. Since the customers may be of different classes (e.g., industrial users and homeowners), communities located in different areas, etc., the receivers are shown as being arranged in groups. Under certain circumstances, it may be desirable to communicate only with the customers associated with a particular group, e.g., Group I. In such a case, the receivers RA-1, RA-2 and RA-3 would respond to address information in the transmitted signal (in a manner hereinafter to be described), while the receivers of Group II would not respond. Thus, the customers of Group I would receive load information in the form of carrier signals transmitted over respective distribution lines generally designated by the numeral 10.

The radio receivers are mounted on poles in proximity to associated distribution transformers. Each transformer couples an electrical power line joined to its primary winding to distribution lines connected to its secondary winding for stepping down the voltage level of the power carried by the associated power line to a level to be supplied via the distribution lines to a group of electricity users. Since each of the distribution transformers services a number of customers, the expense of a separate receiver for each customer is avoided. Additionally, with the receivers mounted on poles, radio transmission from the utility is reliable.

Figure 2:
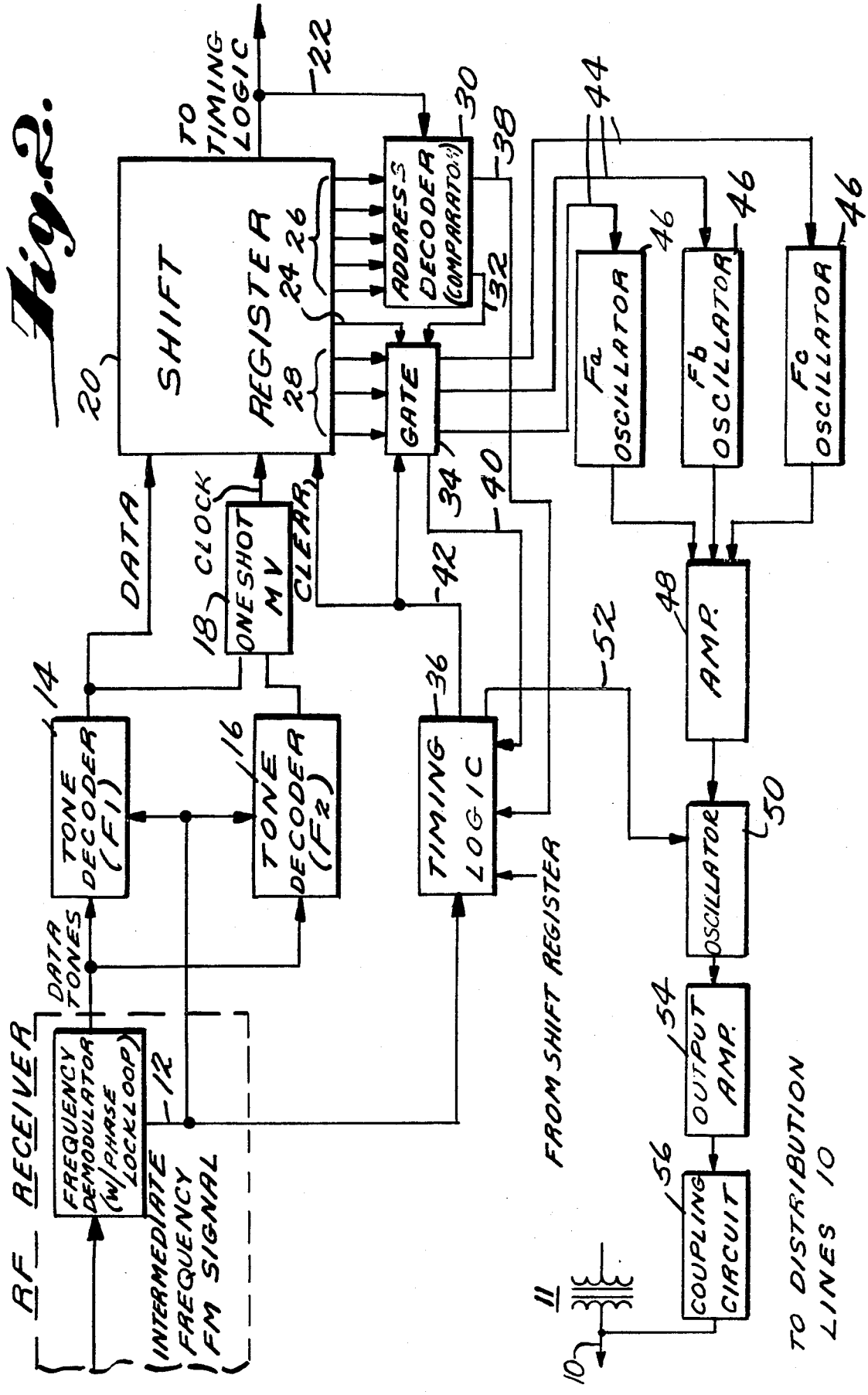
FIG. 2 is a block diagram of a radio receiver and associated circuitry for processing radio transmitted information and applying information to distribution lines for carrier transmission.

FIG. 2 illustrates the circuitry by which the radio transmitted information is received and is then coupled to the distribution lines 10 as a modulated carrier.

The coded signal which is transmitted from the central location comprises a radio frequency carrier which is modulated by tone bursts. Modulation by a tone burst of one frequency is representative of a binary "1," while modulation by a second tone represents a binary "0." For purposes of illustration, it will be assumed that each transmitted message contains ten tone bursts. For reasons which will hereinafter become apparent, the first and seventh tones will be the frequency representing the binary "1."

The coded radio transmitted signal is sensed by each of the receivers of the system. These receivers are conventional FM units. For convenience, only a portion of one unit is illustrated in FIG. 2 commencing with its IF stage. The intermediate frequency modulated signal is applied to a frequency demodulator which is provided with a conventional phase lock loop. When the receiver is silent, there is no output on line 12 from the phase lock loop. However, when a signal is being demodulated, line 12 is active so as to permit a pair of conventional tone decoders 14 and 16 to function. Decoder 14 responds to the modulating tone frequency F1 representative of the binary "1," while decoder 16 is responsive to modulating tone frequency F2 which represents the binary "0". The output of decoder 14 is applied to a one shot multivibrator 18 and to the data input line of a shift register 20. Decoder 16 also is joined to multivibrator 18. Application of pulses to multivibrator 18, produces, after a brief delay, clock pulses which are applied to the shift register 20 to shift its contents.

The shift register has a capacity of 10 bits. Accordingly, as each tone is detected by the decoders, the register is shifted so that any binary "1's" from decoder 14 are stored in proper position within the register. As stated previously, the first and seventh bits of the received coded signal are binary "1's." Thus, when the shift register is full, these "1's" appear on the register stage output lines 22 and 24. It is apparent that except when the register is full, one or both of lines 22 and 24 must have a binary "0" output. The full condition of the register is used as now will be described.

The coded signal sent from the central location contains 5 address bits and 3 command bits. When the register is full, the former appear on the register stage output lines 26, while the command bits appear on output lines 28. The binary "1" on line 22 operats an address decoder 30 to which lines 26 are joined as inputs. The decoder 30 is a conventional comparator. If the address bits correspond with the preset address of the comparator, a binary "1" output appears on line 32 of the decoder 30. Otherwise, no output is generated on line 32. The binary "1's" on lines 24 and 32 partially condition the gate network 34. The output of line 22 from the shift register also is applied to a timing logic circuit which is partially conditioned by the output on line 12 from the phase lock loop. Thus, when the loop is operating to indicate reception of transmitted information, the application of a binary "1" from line 22 or a signal on either of lines 38 and 40 (indicating respectively that no address was decoded by comparator 30 and that for some reason no binary "1" existed on line 24 when the register was full) causes a delayed signal to appear at the output line 42 of circuit 36 to partially enable gate network 34 and then clear the shift register in preparation for the reception of further transmitted information. If a binary "1" is on any of the lines 28 and the gate network 34 is fully conditioned by signals on lines 24, 32 and 42, the command information is passed by the gate network via respective lines 44 to one of the oscillators 46. These oscillators each operate at a different frequency (e.g., 3 KHz, 4 KHz and 5 KHz), and the oscillator outputs are connected via an amplifier 48 to a carrier frequency oscillator 50 operating, for example, at a frequency of 200 KHz. The operation of oscillator 50 is also controlled by a signal on line 52 from the timing logic circuit 36 so that the oscillator does not continuously operate. With oscillator 50 functioning and a tone being applied thereto by one of the oscillators 46, a modulated carrier is generated which is applied via a conventional amplifier 54 and coupling circuit 56 to distribution lines 10 from the secondary side of the distribution transformer 11 associated with the receiver shown in FIG. 2.

Figure 3:
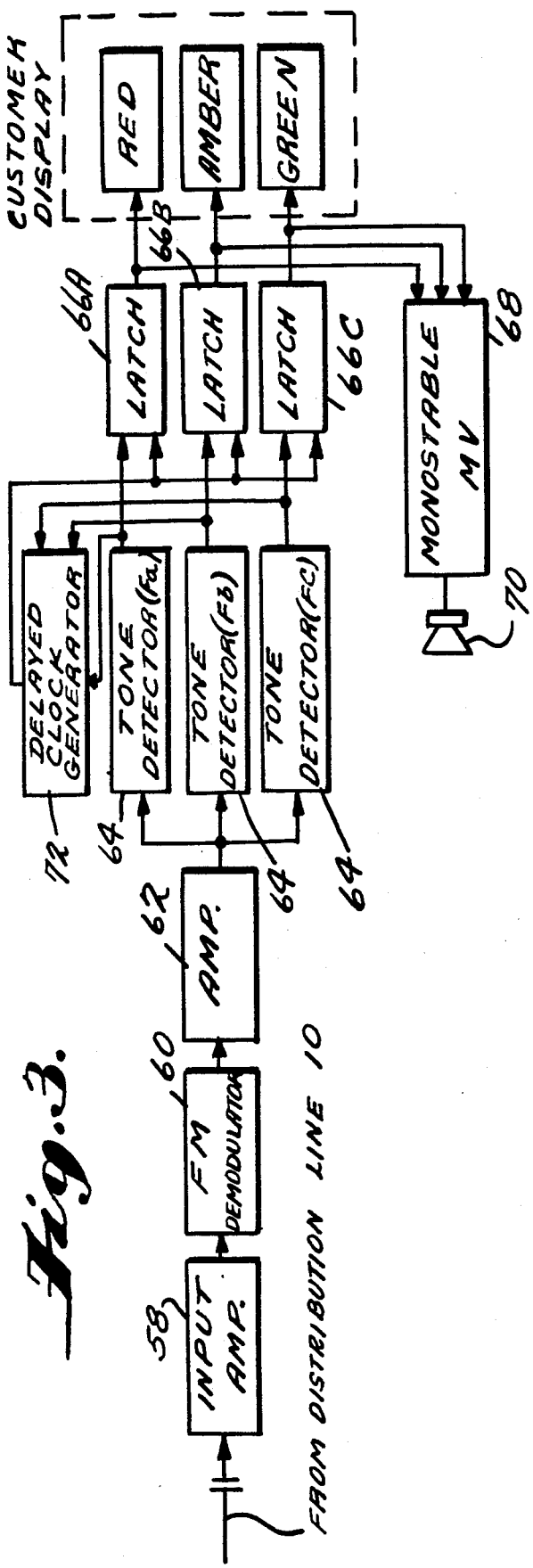
FIG. 3 is a block diagram of circuitry for processing the carrier transmitted information to actuate a user's display unit.

The manner by which the modulated carrier is used to inform a particular customer of electrical demand is illustrated in FIG. 3. An input from one of the distribution lines 10 associated with a given transformer is capacitively coupled to an input amplifier 58 and thence to a FM demodulator 60 where the carrier frequency is stripped leaving only the modulating frequency supplied by one of the oscillators 46. This frequency is amplified at 62 and is applied to the three tone detectors 64 each responsive to a different frequency (Fa, Fb and Fc). For purposes of discussion, it will be assumed that a command bit on one of the output lines 28 from shift register 20 in FIG. 2 caused on oscillator 46 having a frequency Fa to operate, representing a peak load condition. In such a case, Fa would be detected by the corresponding tone detector, causing a latch circuit 66A to function, which in turn, causes a red lamp in a customer display unit to be illuminated to indicate a peak load condition. Similarly, command bits on the other of shift register output lines 28 result in the response of the Fb and Fc tone detectors to actuate latches 66B and 66C, thereby respectively energizing an amber lamp to indicate an impending change in demand or a green lamp representing the absence of a peak demand. The outputs of the latches also are connected to a monostable multivibrator 68 having an alarm 70 at its output. Thus, the visual display is supplemented by a brief audible one indicating an actual or impending change in demand. The length of the audible alarm is a function of the time constant of multivibrator 68.

The latch circuits 66A-66C are conventional flip-flops which are controlled and unlatched by the output of a delayed clock generator 72 having as inputs the outputs of the tone detector 64. Each time a new tone is detected, generator 72 functions to provide a signal to unlatch a previously latched circuit.

With the customer being provided with information concerning the utility's demand status, he can voluntarily adjust his power consumption to conserve energy, and in the case where peak load rates are charged, he also is able to reduce his electrical bill by avoiding usage during peak periods.

A circuit similar to that described with respect to FIG. 3 also can be used by the utility to automatically charge the customer for peak period usage. This is accomplished by employing at the customer's location a known type of meter having changeable scales. Of course, in such a system a transition between scales occurs only when a peak demand period begins or ends. Thus, the three tone detectors of FIG. 3 are not necessary.

Figure 4:
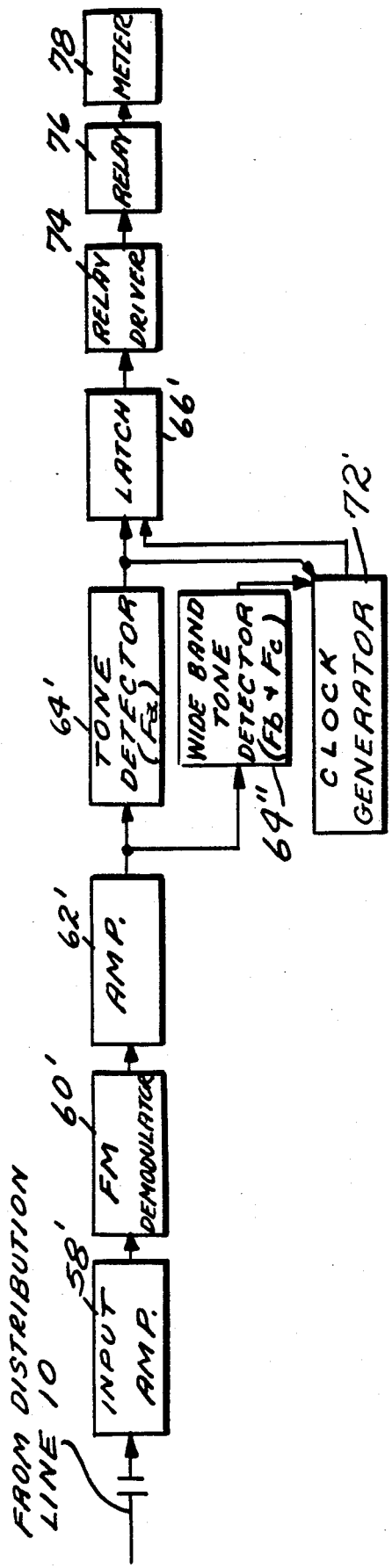
FIG. 4 is a block diagram of circuitry for processing the carrier transmitted information to control a user's meter rate.

Referring to FIG. 4, elements 58', 60' and 62' correspond to the circuits 58, 60 and 62 previously described. Two tone detectors are employed. These include a first detector 64' for detecting tone Fa and a second detector 64" which has a band width wide enough to respond to tones Fb and Fc. Operation of detector 64' in response to a peak demand energizes a latchh 66' causing in turn, relay driver 74 and relay 76 to function so as to change the scale on meter 78 to that used during periods of peak demand. The clock generator 72' is joined to the outputs of the tone detectors and the input of latch 66' to operate in the same manner as previously described with respect to FIG. 3. When the peak period passes, the circuit 66' unlatches causing de-energization of the relay driver which in turn causes the relay to drop, thereby returning the meter to its normal scale.

Figures 5, 6:
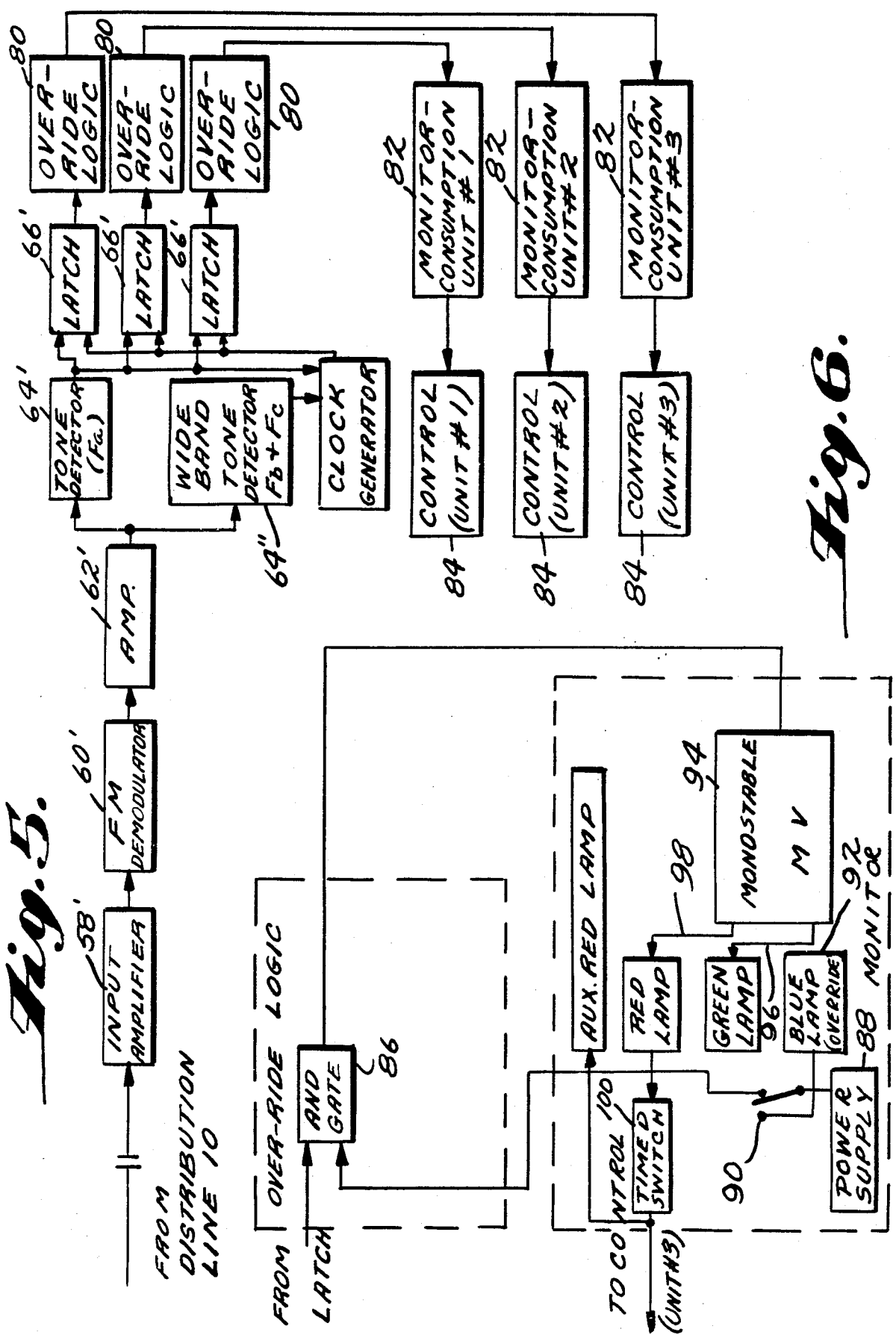
FIG. 5 is a block diagram of circuitry for processing the carrier transmitted information to control a user's power consumption unit.
FIG. 6 is a block diagram illustrating further details of the override logic and monitor shown in FIG. 5.

A circuit of the type described with respect to FIG. 4 also may be used to automatically control the operation of power consuming units at a customer's location. Such an arrangement is illustrated in FIG. 5 with the circuit being expanded to control three units (e.g., a clothes dryer, a water heater and a central air conditioner). Like circuit elements are identically identified in FIGS. 4 and 5, and further description of these elements is unnecessary. The outputs of the latches 66' are connected via override logic devices 80 and customer monitors 82 to the controlling devices 84 for the units. When tone Fa is detected and the override logic 80 is inactive, the output signals from the latches 66'0 are passed to devices 84 which typically are relay circuits for controlling the passage of current to the power consuming units. Thus, with devices 84 energized, power to the units is interrupted.

The override logic and monitors are provided to permit the customer to be aware when a peak period is occurring and when during that period the controlled unit is operative (or inoperative), and also to allow him to override the automatic control commands. Such an arrangement is shown in FIG. 6.

The override logic is merely an AND gate 86 which is partially conditioned by a voltage from power supply 88 so as to pass the latch output. However, a switch 90 is provided between the power supply and the gate 86. When this switch is actuated to interrupt power supply to gate 86, no control signals can pass the gate to shut off the customer's unit during peak demand periods. A blue lamp 92 is associated with switch 90 to be illuminated by the power supply when the circuit to gate 86 is interrupted.

The customer monitor includes a monostable multivibrator 94 to which the output of gate 86 is joined. During non-peak demand periods, an output appears on one of the output lines 96 of the multivibrator to illuminate a green light indicating the lack of peak demand. However, when gate 86 passes a signal representative of peak demand, an output is developed on line 98 from the multivibrator causing a red lamp to illuminate, indicating peak load. This output also energizes a timed switch 100 for prescribing the timing of the control unit 84. An auxiliary red lamp is joined to the output of switch 100 so that the customer is made aware of those periods during peak demand when the controlled unit is actually shut off.

The system which just has been described comprises an improved communication arrangement for informing the customer of peak demand periods. The system also permits the control of billing rates and the supply of electricity to power consuming units during such periods. While the foregoing constitutes a preferred embodiment of the invention, it will be apparent that various circuit components, data arrangements and the like may be employed to practice the invention.

While in the preferred embodiment of the invention the radio receivers are described as being mounted on utility poles, it will be understood that the receivers may be positioned at any other convenient location to permit coupling to the secondary sides of the distribution transformers.

What is claimed is:

1. An improved electrical load management system comprising:
   a plurality of distribution transformers each having primary and secondary windings, each of said transformers coupling an electrical power line joined to its primary winding to distribution lines connected to its secondary winding and stepping down the voltage level of the power carried by the associated power line to a level to be supplied via the distribution lines to a group of electricity users, each distribution line servicing at least one of said users;
   means for transmitting by radio from a central location a coded signal having address and command information;
   a receiver located proximate each of said distribution transformers for receiving said signal independently of said power lines and the transformers;
   means associated with said receivers for decoding said signal;
   means responsive to said decoded signal for generating a modulated carrier signal; and
   means for coupling said carrier signal via the distribution lines to at least one group of users determined by the decoding of said address information.

2. An improved electrical load management system as set forth in claim 1, wherein said receivers are mounted on utility poles.

3. An improved electrical load management system as set forth in claim 1, wherein said decoding means is responsive to the address information for controlling said carrier signal generating means.

4. An improved electrical load management system as set forth in claim 1, wherein said command information is representative of electrical load demand.

5. An improved electrical load management system as set forth in claim 4, further comprising:
   means at the users' locations responsive to said carrier signal for displaying the status of said electrical load demand.

6. An improved electrical load management system as set forth in claim 4, further comprising:
   means at the users' locations responsive to said carrier signal for controlling electrical meters.

7. An improved electrical load management system as set forth in claim 4, further comprising:
   means at the users' locations responsive to said carrier signal for controlling operation of power consuming units.

* * * * *